Feb. 2, 1960    R. A. WINCHESTER    2,923,177
SPEED REDUCER, OVER-DRIVE AND BRAKING UNIT
Filed Aug. 6, 1958    3 Sheets-Sheet 1
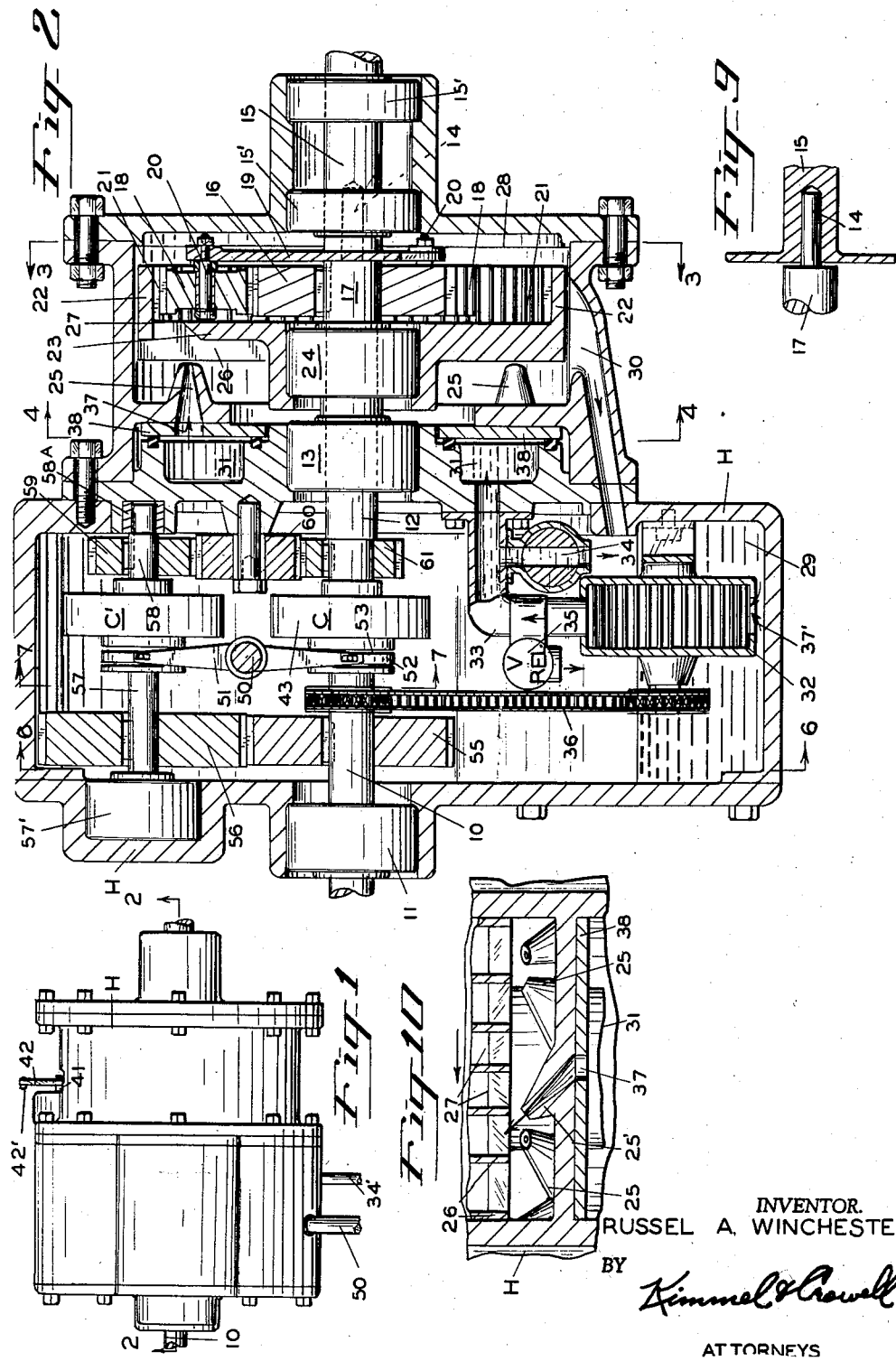
INVENTOR.
RUSSEL A. WINCHESTER
BY
Kimmel & Crowell
ATTORNEYS

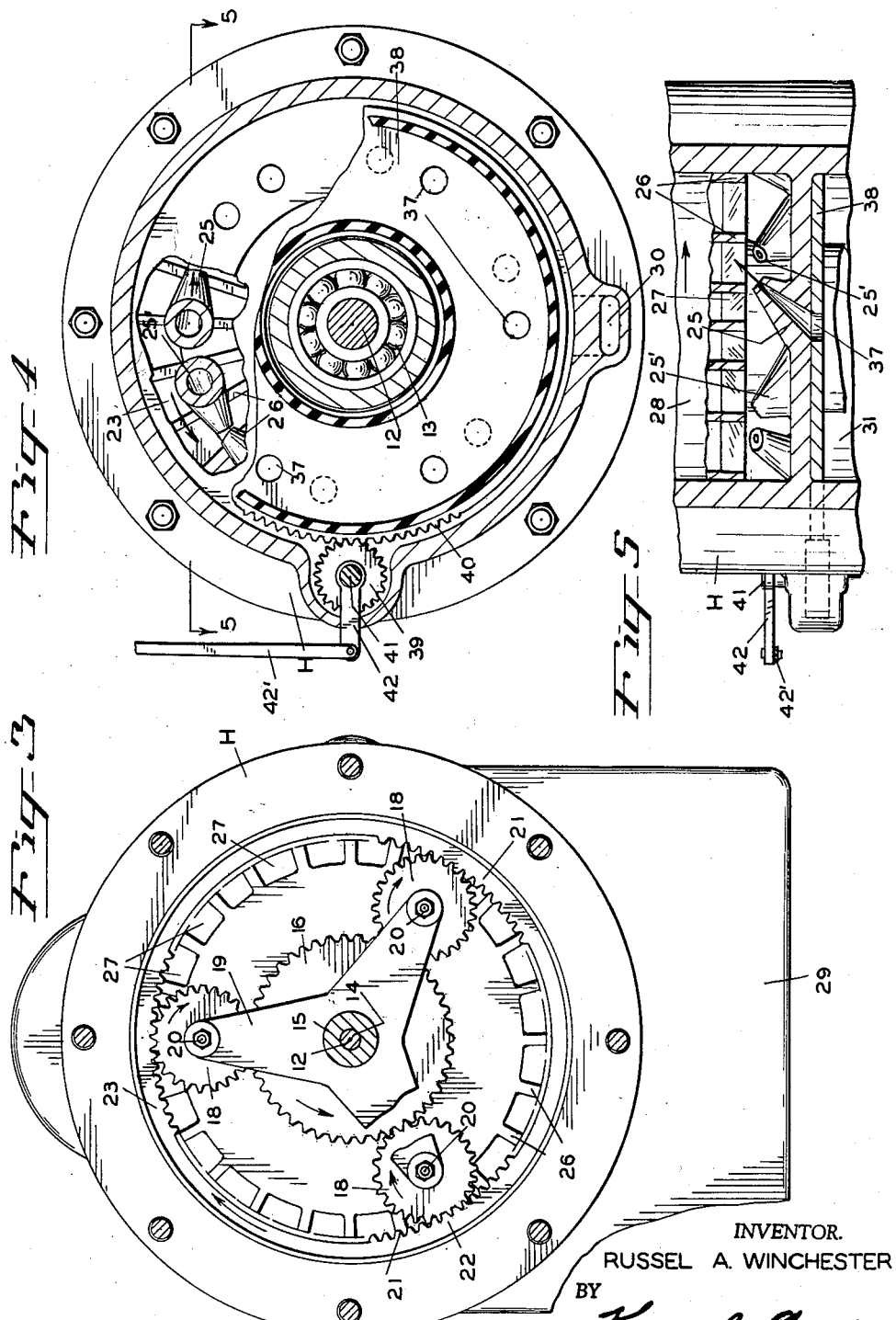

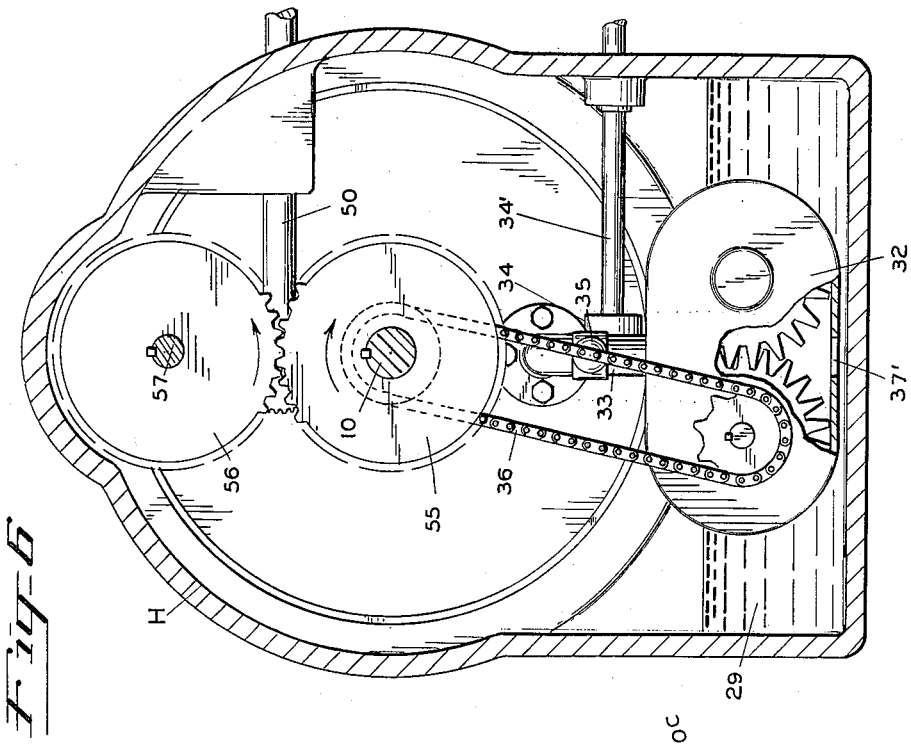
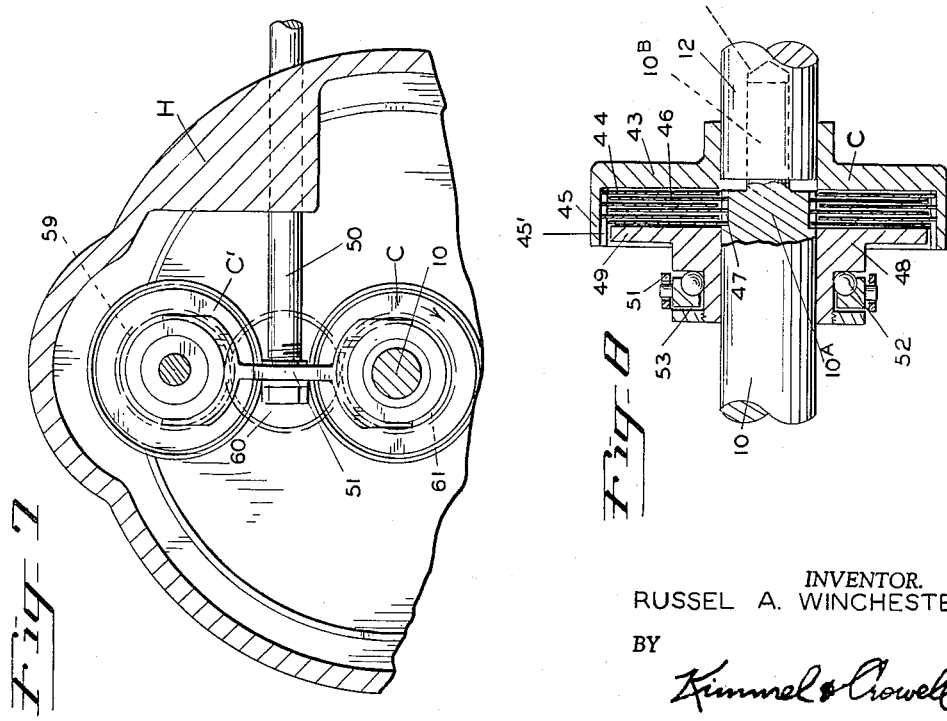
INVENTOR.
RUSSEL A. WINCHESTER

United States Patent Office 2,923,177
Patented Feb. 2, 1960

2,923,177
SPEED REDUCER, OVER-DRIVE AND BRAKING UNIT

Russel A. Winchester, Sandy, Oreg.

Application August 6, 1958, Serial No. 753,511

4 Claims. (Cl. 74—740)

The present invention relates to a speed reducer, over-drive and a braking unit.

The primary object of the invention is to provide an automatic speed changing unit wherein an uninterrupted smooth flow of power is obtained at all times, even while the gear ratio is constantly changing.

Another object of the invention is to provide a fluid control mechanism which will maintain the desired torque at all times, thereby providing for greater efficiency.

Another object of the invention is to provide in a unit of the type described above a brake system which eliminates the use of brake bands, drums and the like, the braking being controlled by a combination of a fluid and planetary gear system.

A still further object of the invention is to provide a self-contained over-drive within the unit controlled by a flow of pressure fluid developed within the unit.

Other objects and advantages will become apparent in the following specification when considered in the light of the attached drawings in which:

Figure 1 is a plan view of the invention as an assembled unit;

Figure 2 is an enlarged longitudinal sectional view taken on line 2—2 of Figure 1, looking in the direction of the arrows;

Figure 3 is a vertical sectional view, taken on line 3—3 of Figure 2, looking in the direction of the arrows;

Figure 4 is a vertical sectional view, taken on line 4—4 of Figure 2, looking in the direction of the arrows and partially broken away for convenience of illustration.

Figure 5 is a horizontal sectional view, taken on line 5—5 of Figure 4, looking in the direction of the arrows;

Figure 6 is a vertical sectional view, taken on line 6—6 of Figure 2, looking in the direction of the arrows with parts broken away for convenience of illustration;

Figure 7 is a fragmentary vertical sectional view, taken on line 7—7 of Figure 2, looking in the direction of the arrows;

Figure 8 is an enlarged fragmentary detail sectional view of the clutch assembly;

Figure 9 is an enlarged fragmentary sectional view detailing the bearing between the intermediate shaft and the driven shaft;

Figure 10 is a view similar to Figure 5 shown operating in the reverse direction.

Referring now to the drawings in detail wherein like reference characters indicate like parts throughout the several figures, the reference character U indicates generally a speed reducer, over-drive and braking unit constructed in accordance with the invention and contained within the housing H. The unit U includes a driving shaft 10 journalled at one end in a bearing 11 and having its other end terminating in a clutch assembly C. An intermediate shaft 12 is journalled by a bearing 13, having one end terminating in the clutch assembly C and the reduced end 14 opposite thereto journalled in one end of a driven shaft 15, maintaining its alignment with the shaft 15. The shaft 15 is journalled in a pair of bearings 15'. The bearings 11, 13 and 15' are each mounted in the housing H in aligned relation.

The shaft 10 is driven constantly in one direction by a source of power (not shown) and is adapted to drive the intermediate shaft 12 through the clutch C when the clutch C is engaged. A gear 16 is keyed to the end 17 of the intermediate shaft 12, and is arranged to rotate the idler pinion gears 18. The gears 18 are journalled to a spider 19 on stub shafts 20. The spider 19 is rigidly connected to the inner end of the driven shaft 15 and rotates this shaft when the spider 19 is rotated by the idler pinion gears 18.

The idler pinion gears 18 mesh with internal teeth 21 formed within a rim 22 of a fluid operated disk 23 journalled on the shaft 12 by a bearing 24.

The rotation of the disk 23 is governed or controlled by a high pressure fluid discharged through either nozzles 25 or nozzles 25' and directed against the fins 26 formed around the rim of the disk 23. The nozzles 25 direct the high pressure fluid against the fins 26 in one direction, while the nozzles 25' direct a high pressure fluid against the fins 26 in the opposite direction. After the fluid strikes the fins 26, it flows through the openings 27 in the disk 23 and into the compartment 28 of the housing H, and is delivered into a fluid sump 29 through a passage way 30.

The nozzles 25 and 25' receive fluid pressure from an annular manifold 31, fed from a gear pump assembly 32 through fluid delivery pipe 33. A fluid control valve 34 is associated with the pipe 33 for controlling the pressure of fluid to the manifold 31. A relief valve 35 is provided for by-passing excess pressure that might be developed within the delivery line 33 under emergency conditions.

The pumping unit 32 is operated from the driving shaft 10 by a driving chain 36.

The high pressure fluid within the manifold 31 is introduced into the desired group of nozzles through ports 37 formed in a rotatable disk 38. Referring to Figures 4 and 5, the rotatable disk 38 for controlling the flow of fluid from the manifold 31 through the nozzles 25 and 25' is shown in position registering with the nozzles 25 so as to cause the disk 23 to rotate in the direction of the arrow.

In the event it is desired to rotate the disk 23 in the opposite direction of the arrow, the ports 37 are caused to register with the nozzles 25' as illustrated in Figure 10, which will direct the high pressure fluid therefrom against the fins 26 in a direction to rotate the disk 23 in the direction of the arrow, Figure 10.

Referring to Figures 1, 4 and 5, the disk 38 is revolved by a pinion 39 meshing with external teeth 40 formed on the periphery of the disk 38, the pinion 39 being revolved by shaft 41 through a crank 42 operated by a linkage 42' leading to a control mechanism (not shown).

The clutch C illustrated in Figure 8 is of the friction disk plate type and includes a drum 43 fixedly secured to the shaft 12. A plurality of friction disks 44 arranged in spaced parallel relation have their outer peripheries keyed to keyways 45' formed on the inner periphery of the flange 45 of the drum 43.

A second set of disks 46 are keyed to the end 10a of the driving shaft 10 in keyways 47 formed therein. A movable hub 48 is provided with an annular flange 49 which moves axially to press the friction disks 44 and 46 together in engaging the clutch. This is accomplished by rotation of the shaft 50 by suitable control means (not shown).

A spindle 10b of reduced size extends from the end of the shaft 10 into a bearing 10c formed within the end of the shaft 12, maintaining the shafts 10 and 12 in alignment with one another.

Referring to Figures 7 and 8, a yoke type clutch throwout arm 51 is keyed to one end of the shaft 50 and has the opposite ends thereof pivotally connected to ball thrust bearings 52 seated in grooves 53 in the hubs 48 of the clutches C and C'. When the clutch C is engaged the clutch C' is disengaged and the shaft 10 will drive the intermediate shaft 12 in the same direction of rotation. If it is desired to drive the intermediate shaft 12 in the opposite direction, a reverse gear mechanism is provided, and will now be described.

Keyed to the shaft 10 is a gear 55 meshed with a gear 56 keyed to a countershaft 57. The countershaft 57 is journalled within a bearing 57' at its one end, and connected to the countershaft 58 at its opposite end by means of the clutch assembly C'. The clutch C' is the same identical structure as the clutch C shown in Figure 8.

The countershaft 58 is journalled within a bearing 58a at its opposite end has keyed thereto a gear 59 which drives an idler pinion 60, which in turn drives a gear 61 keyed to the shaft 12. In order to drive the shaft 12 in reverse direction, the clutch C' is engaged and the clutch C disengaged by rotation of the control shaft 50 by controls (not shown). In Figure 2 the clutches C and C' are both shown in a disengaged position.

The mode of operation will now be described, referring particularly to Figures 2, 3 and 10, the clutches C and C' are shown in released position. The gear pump 32 is driven by the driving shaft 10. The fluid control valve 34 is shown in opened position. The ports 37 of the fluid control disks 38 are shown in alignment with the nozzles 25, referring to Figures 2, 4 and 5 so as to drive the driven shaft 15 in the same forward direction as the driving shaft 10 and the intermediate shaft 12.

When the mechanism above described is in the position shown in Figures 2, 4 and 5, the shaft 10 drives the shaft 12 when the clutch C is engaged, revolving the gear 16 in the direction of the arrow, or counter-clockwise, as illustrated in Figure 3. This would revolve the idler pinions 18 in the direction of the arrows, which would revolve the disk 23 in the direction of the arrow and no power would be delivered to the driven shaft 15. The spider 19 would remain stationary since the driven shaft 15 will not be rotating.

In order to rotate the shaft 15, the operator will gradually close the valve 34 so that fluid pressure will be delivered from the pump 32 through the feed line 33 into the manifold 31, through the ports 37 of the control disk 38, out the jets 25, against the fins 26, which will tend to stop or slow down the rotation of the disk 23, including the ring gear 21. When this happens, the idlers 18 will crawl around within the ring gear 21 as they are rotated by the driving pinion 16 and in turn will rotate the spider 19 and the shaft 15. This rotation of the shaft 15 will begin to occur the instant that the rotation of the ring gear 21 is slowed down, to provide a low gear ratio.

On further closing of the valve 34, the pressure within the manifold 31 will be increased, increasing the pressure delivered by the nozzles 25 against the fins 26 of the ring gear 21 until the point is reached where the ring gear 21 will be stopped from rotation altogether to provide an intermediate gear ratio below that of direct drive.

On closing the valve 34 further additional fluid pressure from the nozzles 25 against the fins 26 will move the ring gear 21 in the opposite direction of the arrow shown in Figure 3 with increasing speed until it attains the speed of the gear 16, and at this point a direct drive will be obtained. The idlers 18 will not revolve on their own axes but will move with the spider 19 revolving at the same speed as the gear 16.

In order to attain an over-drive speed ratio with this unit, the valve 34 is closed still further, delivering a greater pressure through the nozzles 25 to the fins 26 of the ring gear 21, causing the same to rotate faster in the opposite direction of the arrow, Figure 3, and of the overall direction of rotation, which will cause the idler gears 18 to rotate in the opposite direction of the arrows and around the gear 16, moving the spider 19 at a higher rate of speed than the gear 16, delivering the over-drive speed to the driven shaft 15.

The amount of fluid pressure developed by the pump 32 is of sufficient pressure even at low speeds of the driving shaft 10 to revolve the ring gear 21 at its maximum speed, any excessive pressure developed by the pump being relieved by the relief valve 35.

With a conventional type of transmission, the speed of the driving shaft has to be maintained at a given ratio at all times regardless of the actual power demanded. This is the difference between this system of power transmission, and as stated above the conventional type, and one of the advantages of the operation of this transmission is in the maintaining of a sufficient fluid supply even at low engine speeds, to operate the ring gear at the desired speed, maintaining the desired revolutions of the driven shaft 15.

After the driven shaft 15 has attained the desired speed, as for instance in a motor vehicle, by simply increasing the fluid pressure, the road speed will be maintained even at reduced engine speeds.

I will now describe the action of this new and improved transmission while operating in reverse. The clutch C' is engaged by rotating the shaft 50 by a control (not shown) outside the unit. When this happens the shaft 10 rotates the gear 55, gear 56, shaft 57, clutch C', shaft 58, gear 59, idler pinion 60 and gear 61, the gear 61 being keyed to the intermediate shaft 12 so as to drive the shaft 12 in the reverse direction to that of the shaft 10, including the gear 16 which is revolved in the opposite direction of the arrow, as indicated in Figure 3 so as to rotate the ring gear 21 in the opposite direction of the arrows.

The crank 42 is operated by the operator, revolving the pinion gear 39 in a direction to register the openings 37 of the rotatable disk 38 with the nozzles 25' so that the fluid jets therefrom will revolve the ring gear 21 in the direction of the arrows, referring to Figures 3 and 10.

When the shaft 10 rotates the shaft 12 through the reverse gear mechanism above described, it will revolve the gear 16 in the opposite direction of the arrow, Figure 3, revolving the idler pinions 18 in the opposite direction of their arrows, which will rotate the ring gear 21 in the opposite direction of the arrow, or counter-clockwise, as seen in Figure 3. When this happens the driven shaft 15 will remain stationary.

In order to apply power to the shaft 15, the valve 34 is partially closed, delivering fluid from the pump 32 into the manifold 31 and out through the nozzles 25' setting up a resistance to the rotation of the ring gear 21. The ring gear 21, tending to travel in the opposite direction of the arrow, as seen by Figures 3 and 10, will begin to move the spider 19 and the driven shaft 15 in a clockwise direction, rotating the shaft 15 in the opposite, or reverse, direction.

As the valve 34 is further closed, the speed of rotation of the driven shaft 15 will be increased through the same gear ratios in reverse, as was described in the forward movement.

When it is desired to use the power of the engine as a brake, the clutches C and C' are brought to neutral, the fluid continues to flow from the jets 25 rotating the ring gear 21 in the opposite direction of the arrow, as seen in Figure 3, and in the direction of the arrow in Figure 5, continuing to operate in this fashion with the clutches disengaged until gear 16 is in reverse action, because of the action between the gear 16 and the pinion gears 18 and ring gear 21, until the gear 16 reaches the synchronized speed of the shaft 10. The clutch C' is then engaged by the operator and the lever 42 is operated, rotating the pinion 39, revolving disk 38, bringing the ports 37 in alignment with the reverse jets 25'. On this setting the control valve 34 can be used to regulate the torque applied in the reverse direction of forward movement through the reverse gear, thus applying a braking action with the power of the motor.

Having thus described the preferred embodiments of the invention, it should be understood that numerous modifications and adaptations may be resorted to without departing from the scope of the appended claims.

What is claimed is:

1. A speed reduction, over-drive and braking unit comprising a housing, a driving shaft journalled for rotation in said housing, an oil pump mounted in said housing and driven by said driving shaft, a countershaft spaced from and parallel to said driving shaft journalled in said housing, gears connecting said driving shaft and said countershaft for rotating said countershaft oppositely of said driving shaft, an intermediate shaft extending axially of said driving shaft, a clutch detachably connecting said driving shaft and said intermediate shaft, a second countershaft extending axially of said first named countershaft, a second clutch detachably connecting said first countershaft and second countershaft, gears connecting said second countershaft and said intermediate shaft for rotating said second shaft and said intermediate shaft in the same direction, control means connected to said clutches for selectively actuating said clutches to drive said intermediate shaft in a forward or in a reverse direction with respect to the rotation of said driving shaft, a driven shaft journalled in said housing, variable ratio planetary gearing means connecting said intermediate shaft to said driven shaft, and hydraulic means operated by said hydraulic pump for varying the ratio of said planetary gearing means whereby said driven shaft is driven at a variable speed from said intermediate shaft, said hydraulic means including a first plurality of hydraulic jets inclined in one direction, a second plurality of hydraulic jets inclined in the opposite direction, and a vane wheel forming a part of said planetary gearing means and arranged to have hydraulic fluid from a selected one of said first and said second plurality of jets impinging thereagainst.

2. A device as claimed in claim 1 wherein said planetary gearing means includes a ring gear mounted on said vane wheel, a gear mounted on said intermediate shaft inwardly of said ring gear, and a planet pinion mounted on a spider fixedly secured to said driven shaft in mesh with both the gear on said intermediate shaft and said ring gear.

3. A device as claimed in claim 2 wherein adjustable means are provided for directing hydraulic fluid from said pump through a selected one of said first and said second plurality of jets.

4. A device as claimed in claim 3 wherein adjustable valve means is provided for varying the pressure of hydraulic fluid flowing from said pump to said jets.

References Cited in the file of this patent

UNITED STATES PATENTS

| | | |
|---|---|---|
| 2,254,335 | Vincent | Sept. 2, 1941 |
| 2,637,217 | Taylor | May 5, 1953 |
| 2,719,442 | O'Leary | Oct. 4, 1955 |

FOREIGN PATENTS

| | | |
|---|---|---|
| 376,752 | Italy | Nov. 24, 1939 |